July 9, 1935.  W. F. BURKE  2,007,596

TEMPERATURE CONTROL

Filed May 7, 1935

William F. Burke
INVENTOR
BY Harvey Lea Dodson
ATTORNEY

Patented July 9, 1935

2,007,596

UNITED STATES PATENT OFFICE 2,007,596

TEMPERATURE CONTROL

William F. Burke, Athens, Ohio, assignor to The McBee Company, Athens, Ohio, a corporation of Ohio Application May 7, 1935, Serial No. 20,116

12 Claims. (Cl. 219—19)

My invention relates to the type of control described in Patent No. 1,961,829, issued to George A. Rutkoskie and Nelson S. Welk, as the temperature control therein described is used in connection with a specific type of printing press for producing wax carbon spots on sheets of paper. I have found in practice that the control is "per se" useful without being used in connection with a press of any kind. I have found that in any structure when there are a number of parts, either of a machine or other apparatus which require their temperature to be maintained at a critical point that when an ordinary type of thermostatic control is used there is too much lag and the parts will either remain hot too long or will cool off too much before the control will operate.

My invention has for its object to provide a control mounted in a casing which may be located conveniently on the side of the apparatus or press and which will possess a degree of extreme sensitiveness far beyond the standard devices of this character.

My means of accomplishing the foregoing objects may be more readily understood by having reference to the accompanying drawing which is hereunto annexed and is a part of this specification, in which—

Similar reference numerals refer to similar parts throughout the entire description.

Figure 1:
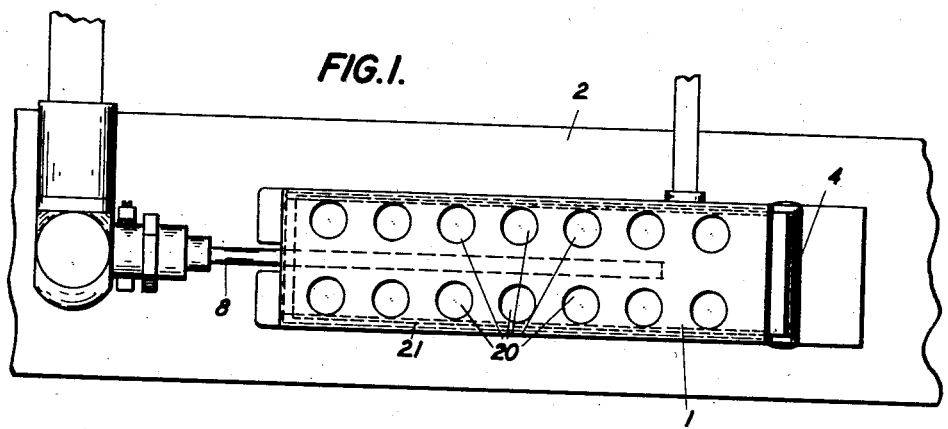
Fig. 1 is a side elevation of the device with the container closed.
Figure 2:
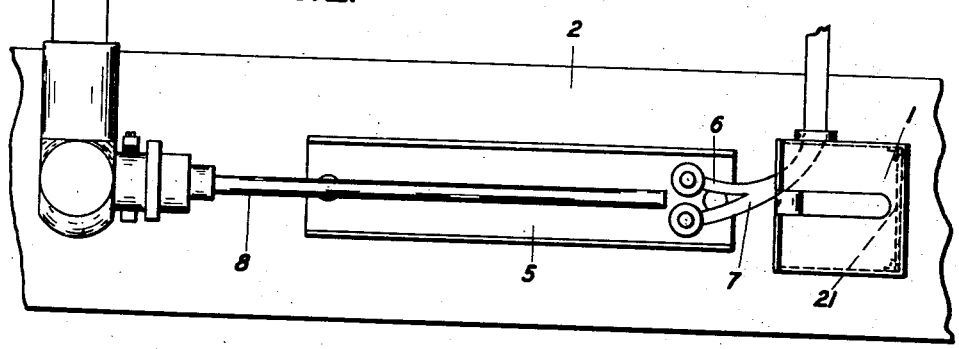
Fig. 2 is a similar view with the container open.
Figure 3:
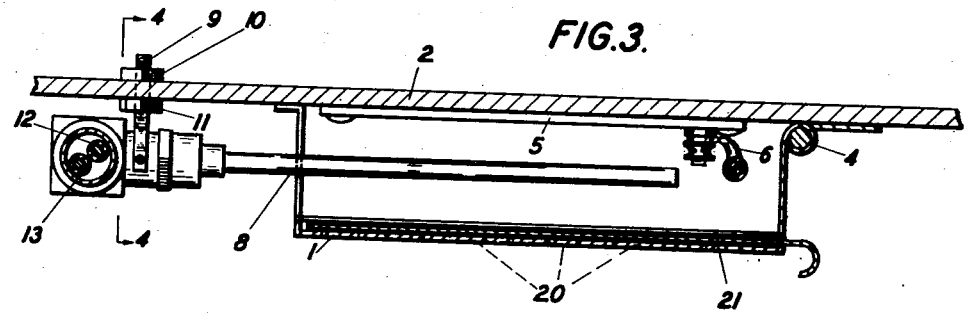
Fig. 3 is a longitudinal sectional view, some of the parts being shown in elevation.

As shown in the drawing, the control is mounted in a casing 1 which may be mounted on the side 2 of a press or other apparatus having parts, the temperature of which must be maintained at a critical point. A fragmentary portion only is shown as it forms no part of this invention. Preferably the casing 1 adjacent the side 2 is hinged as at 4 so that it can be conveniently opened or closed as occasion requires.

I have found in practice that it is necessary to provide means to compensate for the temperature of the room where the apparatus employing my heat control is located. I accomplish this by the provision of a plurality of vents 20 which may be closed by a shutter 21 slidably mounted upon the front wall of the casing 1 in such a manner that all of the vents 20 or a portion of them may be opened or closed as conditions require. For example, in the summer months these vents are left opened in order to dissipate the heat quickly and do away with the lag. In winter months they are closed in order that the room temperature will not cool the tube too quickly and create a lag.

Figure 4:
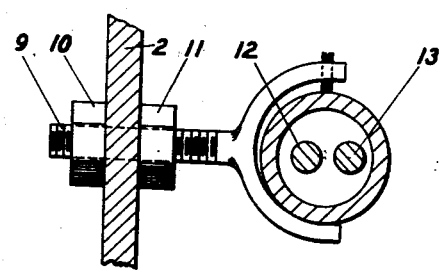
Fig. 4 is an enlarged section on the line 4—4 in Fig. 3.

An electric heating element 5 is mounted in the casing 1 being secured in position in any suitable or desired manner. Suitable electric conductors 6 and 7 connect the electric heating element 5 to a source of electric current (not shown). The control comprises a tubular heat responsive element 8 which is mounted in the casing 1, adjacent the heating element 5 but spaced therefrom. As shown, this heat responsive element is formed of a tube which contains a heat responsive liquid susceptible of quick response to heat variations, though it will be clear to those skilled in the art that any form of heat responsive means may be employed. Suitable conductors 12 and 13 lead to a control panel (not shown). I provide means to adjust the position of the heat responsive element 8 with relation to the heating element 5 which as shown consists of a bolt 9, the end of which is forked as clearly seen in Fig. 4. The tube 8 may be fixedly secured in this fork by means of a set screw or in any other desired manner. The other end of the bolt 9, is threaded and extends through the wall of the casing. Nuts 10 and 11 provide convenient means for adjusting the position of the bolt and in turn the tube 8. I have found this means of adjustably mounting this heat responsive element very satisfactory in practice besides decidedly inexpensive. Obviously many forms of mechanical adjustments will suggest themselves to others and I do not desire to be understood as limiting myself to the specific means illustrated except as such limitations appear in the hereinafter contained claims. I have found in practice that by moving this heat responsive element 8 towards or away from the heating element 5, (which heating element is preferably connected in parallel with the heater in the part (not shown) whose temperature it is desired to maintain at a critical point) it will respond very rapidly. Moreover it can be used for example where a thermocouple could not possibly be employed.

Having described my invention what I regard as new and desire to secure by Letters Patent is—

1. A device of the character described comprising a casing, an electric heating element therein, a heat-responsive element inside of the casing and adjacent said heating element to control said heating element, and means to move said heat-responsive element by gradual movement towards or away from the heating element to adjust the heat-responsive element to maintain a constant predetermined temperature.

2. A device of the character described comprising a casing, an electric heating element therein, a heat-responsive element inside of the casing and adjacent but spaced from said heating element to control said heating element, and means to move said heat-responsive element by gradual movement towards or away from the heating element to adjust the heat-responsive element to maintain a constant predetermined temperature.

3. A device of the character described comprising a casing, an electric heating element therein, a heat-responsive element inside of said casing and adjacent said heating element, an adjustable support for said heat-responsive element to move said heat-responsive element by a gradual movement toward or away from the heating element to adjust the heat-responsive element to maintain a constant predetermined temperature, and means to lock said adjustment when made.

4. A device of the character described comprising a casing, a hinge for said casing, an electric heating element therein, a heat-responsive element inside of said casing and adjacent said heating element, an adjustable support for said heat-responsive element to move said heat-responsive element by a gradual movement toward or away from the heating element to adjust the heat-responsive element to maintain a constant predetermined temperature, and means to lock said adjustment when made.

5. A device of the character described comprising a casing, an electric heating element therein, a heat-responsive element inside of said casing and adjacent but spaced from said heating element, an adjustable support for said heat-responsive element to move said heat-responsive element by a gradual movement toward or away from the heating element to adjust the heat-responsive element to maintain a constant predetermined temperature, and means to lock said adjustment when made.

6. A device of the character described comprising a casing, an electric heating element therein electrically connected with the heater for the part whose temperature is to be maintained within critical limits, a heat-responsive element in said casing adjacent said heating element, and means to move said heat-responsive element by a gradual movement towards or away from the heating element to adjust the heat-responsive element to maintain a constant predetermined temperature.

7. A device of the character described comprising a casing, an electric heating element therein electrically connected with the heater for the part whose temperature is to be maintained within critical limits, a heat-responsive element in said casing adjacent but spaced from said heating element, and means to move said heat-responsive element by a gradual movement towards or away from the heating element to adjust the heat-responsive element to maintain a constant predetermined temperature.

8. A device of the character described comprising a casing, an electric heating element therein, a highly sensitive heat-responsive element inside of the casing and adjacent said heating element to control said heating element, and means to move said heat-responsive element by gradual movement toward or away from the heating element to adjust the heat-responsive element to maintain a constant predetermined temperature.

9. A device of the character described comprising a casing, an electrical heating element therein, a heat-responsive element adjacent said heating element also in said casing, and means to move said heat-responsive element by a gradual movement towards or away from the heating element to adjust the heat-responsive element to maintain a constant predetermined temperature, there being a plurality of vents in the walls of said casing, and means to open and close any predetermined number of said vents.

10. A device of the character described comprising a casing, an electrical heating element therein, a heat-responsive element adjacent said heating element also in said casing, and means to move said heat-responsive element by a gradual movement towards or away from the heating element to adjust the heat-responsive element to maintain a constant predetermined temperature, there being a plurality of vents in the wall of said casing, and a shutter slidably mounted whereby any predetermined number of said vents may be closed or opened.

11. A device of the character described comprising a hinged casing, an electrical heating element therein, which extends longitudinally of said casing, a tube in said casing which contains a heat-responsive element, said tube extending alongside of and adjacent to said heating element, and means to move said heat-responsive element by a gradual movement towards or away from the heating element to adjust the heat-responsive element to maintain a constant predetermined temperature, there being a plurality of vents in the wall of said casing, and a shutter slidably mounted whereby any predetermined number of said vents may be closed or opened.

12. A casing, an electric heating element therein, a cylinder mounted in said casing, adjacent said heating element, said cylinder containing a liquid heat-responsive element, a bolt supporting one end of said cylinder, and means to adjust the position of said bolt whereby the cylinder can be moved gradually towards or away from said heating element.

WILLIAM F. BURKE.